Feb. 17, 1942.  E. A. EDWARDS  2,273,631
SANITARY FITTING FOR THERMOMETER STEMS AND THE LIKE
Filed March 27, 1941
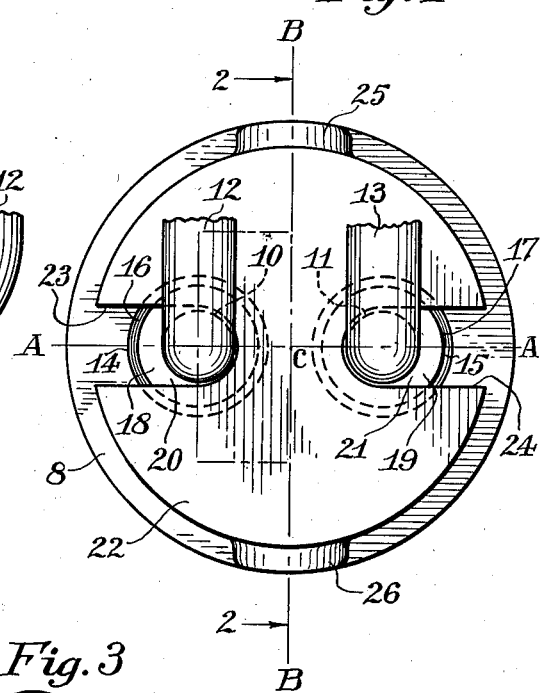
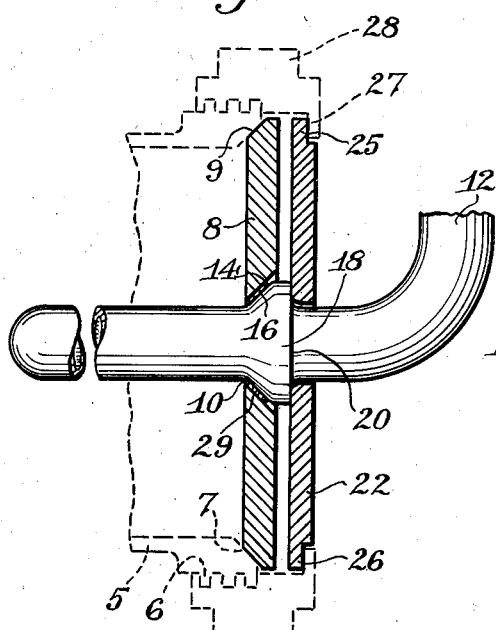
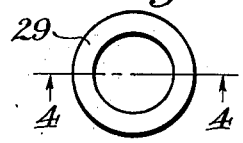
INVENTOR.
EVAN A. EDWARDS
BY
D. Clyde Jones
ATTORNEY.

Patented Feb. 17, 1942

2,273,631

UNITED STATES PATENT OFFICE 2,273,631

SANITARY FITTING FOR THERMOMETER STEMS AND THE LIKE

Evan A. Edwards, Rochester, N. Y., assignor to Taylor Instrument Companies, Rochester, N. Y., a corporation of New York Application March 27, 1941, Serial No. 385,454

2 Claims. (Cl. 73—375)

This invention relates to fittings for condition-sensing bulbs such as for industrial thermometers of the type used for indicating or controlling the temperature of milk or the like.

In the patent to Olson, No. 2,244,798, granted June 10, 1941, there is disclosed a sanitary fitting and a thermometer which can be quickly disassembled for cleaning and then quickly assembled for use.

In such a sanitary fitting provision was made for retaining one thermometer stem only. However, in many installations it is desirable to mount two thermometer stems in a given fitting, one stem being that of an indicating glass thermometer and the other stem of a temperature recorder and controller.

The fitting disclosed in the mentioned Olson application with its provision for retaining one thermometer stem only, affords a leakless metal-to-metal joint. When, however, duplicate openings were provided in the mentioned fitting to receive two thermometer stems, it was found to be impractical, due to manufacturing variations from desired tolerances, to obtain leakless joints between the fitting and the two stems passing therethrough.

In accordance with the present invention, there is provided an arrangement wherein the several parts of the fitting adjust themselves to compensate for variations from the prescribed tolerances of the several parts and thus insure liquid-tight joints between the fitting and the two thermometer stems passing therethrough.

The invention will best be understood by reference to the drawing in which Fig. 1 is a front view of the fitting with the clamping nut, therefore, omitted and with the thermometer stems broken away; Fig. 2 is a section on the line 2—2 of Fig. 1 showing the fitting applied to a pipe section and Figs. 3 and 4 are views of a paper gasket for use with this fitting.

In the drawing, the invention is shown applied to a milk pipe line. The section 5 of this line has external threads 6 at one end thereof and terminates in a female conical seat 7. A circular plate 8 of a diameter slightly smaller than the external diameter of the pipe section 5, is provided at one surface with a male peripheral, conical seat 9 to cooperate with the seat 7 of the pipe section. The plate 8 is provided with two openings 10 and 11 so located that the stems 12 and 13 respectively, of conventional thermometers or controllers can project endwise into the pipe section 5 in spaced relation to the inner wall thereof. The other surface of the plate has female conical seats 14 and 15 bordering the openings 10 and 11 through the plate. These conical seats cooperate respectively with the male conical seats 16 and 17 on the ferrules 18 and 19, which are formed integrally with the stems 12 and 13 of the mentioned thermometers. These ferrules are also provided with shoulders respectively designated 20 and 21. The shoulders of the ferrules are adapted to be engaged by a washer 22 having two slots 23 and 24 respectively opening through the edge of the washer and extending preferably along a diameter A of the washer to points where the closed ends of the slots register with the openings through the plate when these parts are placed in superimposed relation. The washer 22 may be of the same size or slightly smaller in diameter than the plate. As herein illustrated, the washer is of smaller diameter than the plate but is provided with two lugs 25 and 26 extending in opposite directions therefrom along a diameter B normal to the diameter A previously mentioned. The front surfaces of these lugs, as viewed in Fig. 1, are generally rounded to provide point contact with a flange 27 on a clamping nut 28 as shown in Fig. 2. This clamping nut is internally threaded to engage the external threads on the end of the pipe section.

It will be understood that in assembling the fitting just described, the stems 12 and 13 of the two thermometers are inserted through the clamping nut 28. Thereafter the stems 12 and 13 are inserted sidewise into the slots 23 and 24 of the washer 22 with the left face (Fig. 2) of the washer engaging the shoulders 20 and 21. Then the stems 12 and 13 are inserted through the openings 10 and 11 in the plate 8. The parts in this position are assembled on the pipe section by screwing the nut 28 onto the threaded end of the pipe section.

The male seat 16 on the ferrule of the first stem 12 engages the female seat 14 on the plate 8, while the male seat 17 on the ferrule of the second stem 13 engages the other female seat 15 on the plate 8. It is preferred to use paper gaskets 29 between each cooperating male seat on a ferrule and its related female seat on the plate.

In the present fitting, when the clamping nut 28 is tightly screwed on the end of the pipe section, the male seat 9 of the plate 8 engages the female seat 7 at the end of the pipe section to provide a leak proof joint. Also the washer 22 engages the shoulders 20 and 21 on the two stems, applying thereto a force the resultant of which is effective along the diameter A of the washer.

The clamping nut through its flange 27 engages the lugs 25 and 26 on the washer 22 thereby applying to this washer a force the resultant of which is along the diameter B at right angles to the diameter A. This application of forces to the washer is similar to that in a gimbal joint, to afford universal rocking motion of this washer. The action of the washer is the same as if a force were applied thereto at a point C defined by the intersection of the line A and B.

It will be appreciated that the washer will tend to rock and thus will compensate for inequalities in the fit of the various parts. With this construction the advantages of the sanitary fitting disclosed in the mentioned Olson patent can be extended to a multi-stem unit and still obtain the leakless joints that are necessary in such a construction.

What I claim is:

1. In combination with a pair of thermometer stems or the like each provided with a ferrule having a circumferential male conical seat and an opposing shoulder, a part having an opening therethrough, a member serving to close said opening, said member having a pair of apertures therethrough of approximately the respective diameters of said stems, said member also having a female conical seat bordering each of said apertures, a second member having slots therein extending along a diameter of said member from the edge thereof into substantial registry with said female conical seats, said second member at one surface thereof having its edge portions at said slots engaging the shoulders on said stems, said second member on the other surface thereof having lugs positioned on a second diameter of said second plate, said second diameter being perpendicular to said first-mentioned diameter, and means engaging said lugs and said part to draw them toward each other whereby said seats are held in engagement, said stems with their ferrules being removable through said last-mentioned means.

2. A fitting for use with a pair of thermometer stems or the like, each stem being provided with a ferrule having a circumferential male conical seat and an opposing shoulder, said fitting comprising a circular plate member having a pair of bores of approximately the diameters of the thermometer stems whose centers lie in a diameter of the plate member and spaced at substantially equal distances from the center thereof, said plate member having a female conical seat bordering each bore of a size to cooperate with a related one of said male seats, a second circular plate member having slots therein extending from the edge thereof into registry with said female conical seats, the edge portions of said slots engaging the shoulders on said stems, said second plate member having a pair of lugs extending from the periphery thereof on a diameter substantially at right angles to the longitudinal axis of said slots, and means engaging the periphery of said first member and said lugs for drawing said plate members toward each other whereby said seats are held tightly in engagement; said stems with their ferrules being removable through said last-mentioned means.

EVAN A. EDWARDS.